Feb. 12, 1952     R. T. MAIORANY     2,585,146
RESTRAINING SPRINGS FOR RATE GYROSCOPES
Filed Dec. 29, 1948

INVENTOR.
ROBERT T. MAIORANY
BY
ATTORNEY

Patented Feb. 12, 1952

2,585,146

UNITED STATES PATENT OFFICE 2,585,146

RESTRAINING SPRINGS FOR RATE GYROSCOPES

Robert T. Maiorany, Bronx, N. Y., assignor to Bendix Aviation Corporation, Teterboro, N. J., a corporation of Delaware Application December 29, 1948, Serial No. 67,979

9 Claims. (Cl. 74—5.4)

This invention relates to gyroscopes and more particularly to restraining springs for rate gyroscopes.

An object of my present invention is to provide a novel restraining spring arrangement for a rate gyroscope by which the precession of the gyroscope and return to its initial position is maintained at a uniform rate.

Another object of my invention is to provide a restraining spring arrangement for a rate gyroscope of the character indicated in which adjustments may be readily made for refining the null setting of the gyroscope and to increase the sensitivity thereof.

A further object of this invention is to provide a restraining spring arrangement for a rate gyroscope of the character indicated which shall consist of few and simple parts, relatively inexpensive to manufacture, which shall be positive and accurate in operation, which shall have a large variety of application and yet be practical and efficient to a high degree in use.

Other objects of this invention will in part be obvious and in part hereinafter pointed out.

Figure 1:
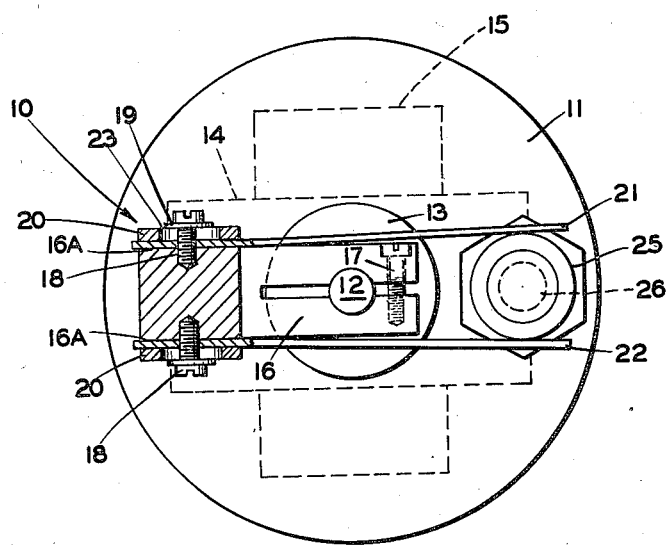
Figure 2:
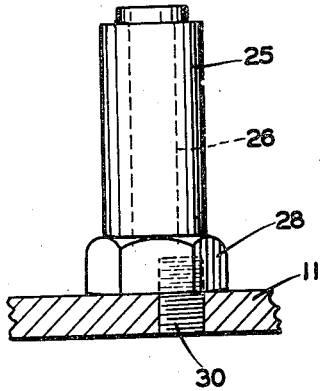
Figure 3:
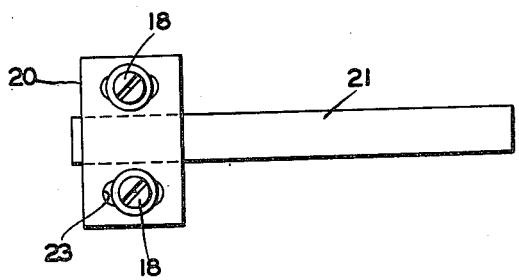

In the accompanying drawings forming a part of this specification in which one embodiment of my invention is illustrated, and wherein similar reference characters are used to designate corresponding parts throughout the several views, Fig. 1 is a front elevational view with portions shown in cross-section of the novel restraining spring arrangement for a rate gyroscope, Fig. 2 is an enlarged plan view of an eccentrically mounted roller for adjustment of the null setting of the gyroscope, while, Fig. 3 is a plan view of the cantilever spring and its adjustable mounting.

The several objects of my invention are achieved by providing a mounting block on a gimbal frame trunnion journaled in the instrument casing and passing therethrough; the block being mounted exteriorly of the instrument casing. Two cantilever springs are adjustably mounted on the block, the inner faces of the springs coacting with an eccentrically mounted roller fixed into the casing of the instrument. By adjusting the lengths of the two cantilever springs, the precessional rate of the gyroscope may be regulated. The eccentric mounting of the roller engaged by the cantilever springs provides a means for setting the null position of the gyroscope.

Referring now in detail to the drawings, the numeral 10 designates the novel restraining spring arrangement fixed exteriorly of the gyroscope casing 11 to a gimbal frame trunnion 12. The trunnion is journaled through a bearing 13 mounted in the instrument casing 11. The trunnion 12 is fixed to a gimbal frame 14 within the casing, the gimbal frame carrying a gyroscope rotor 15.

The spring arrangement 10 comprises a bifurcated block 16 which slips over the trunnion 12 and is fastened thereto by a recessed screw 17. The bifurcated block 16 is T-shaped, the free end of the block acting as a counterweight. Fixed to the free end of the block 16 and within a recess 16a therein, as by screws 18, washers 19 and plates 20 are two cantilever springs 21 and 22. The plates 20 are provided with elongated slots 23 through which the screws 18 pass for fastening the cantilever springs to the block 16. As will hereinafter more fully appear, the plates 20 may be moved radially inwardly or outwardly to independently adjust the effective lengths of the cantilever springs 21 and 22.

The inner faces of the springs 21 and 22 are adapted to coact with a roller 25 rotatably mounted on a stud shaft 26. The shaft 26 is integral and concentric with a nut 28, said nut being eccentrically mounted to the casing 11 by a screw 30. It is to be noted that the diameter of the roller 25 is slightly larger than the width of the bifurcated block 16 so that the block simultaneously exerts tension on both of the springs when gimbal frame 14 is in neutral position. This arrangement of the block and roller will permit a slight bias to be exerted by the springs 21 and 22 for maintaining the gimbal frame 14 in its null or neutral position.

Precession of the gyroscope 15 will cause the gimbal frame 14 and its trunnion 12 to oscillate, causing the block 16 to oscillate. The springs 21 or 22, depending upon the direction of rotation of the trunnion, will increase the bias exerted thereby on the roller 25 to return the gyroscope to its neutral position. By providing the roller 25, the friction between the two elements is practically nil. The eccentric mounting of the roller 25 provides a readily accessible means for obtaining a refined adjustment of the null position of the gyroscope 15. The arrangement of the two cantilever springs, the inner faces of which register with the roller provides a uniform rate of precession and return of the gyroscope.

The uniform rate of precession and return of the gyroscope is extremely desirable in instances where a rate signal is obtained by the use of the pick-up coils fixed to the gimbal frame of the gyroscope. This uniformity reduces the hysteresis normally found in rate signal developing gyroscopes having other spring arrangements.

It will thus be seen that there is provided a restraining spring arrangement for a rate gyroscope in which the several objects of this invention are achieved, and which is well adapted to meet the conditions of practical use.

As various embodiments may be made of the above invention, and as various changes may be made in the embodiment above set forth, it will be understood that all matter herein described or shown in the accompanying drawings is to be interpreted as illustrative and not in a limiting sense.

Having thus described my invention, I claim as new and desire to secure by Letters Patent:

1. Restraining springs for a cased rate gyroscope comprising a mounting block exteriorly of the case and movable with the gimbal frame of the gyroscope, two spaced cantilever springs fixed at one end thereof in opposing relationship to said block, and having their other ends free to move relative to one another and a roller mounted exteriorly of the gyroscope case and engaging opposing faces of said springs.

2. Restraining springs for a cased rate gyroscope comprising a mounting block movable with the gimbal frame of the gyroscope, two cantilever springs fixed at one end thereof in opposing relationship to said block, means for adjusting the effective lengths of said springs, and a roller engaging opposing faces of said springs and eccentrically mounted on the gyroscope case to adjust the neutral position of the gyroscope.

3. Restraining springs for a rate gyroscope comprising a mounting block movable with the gimbal frame of the gyroscope, two cantilever springs fixed at one end thereof in opposing relationship to said block, means for independently adjusting the effective lengths of said springs, and a roller mounted on a fixed support and engaging opposing faces of said springs.

4. Restraining springs for a rate gyroscope comprising a mounting block movable with the gimbal frame of the gyroscope, two spaced cantilever springs fixed at one end thereof in opposing relationship to said block, means for independently adjusting the effective lengths of said springs, and a roller mounted on a fixed support and engaging opposing faces of said springs, the diameter of said roller being greater than the distance between said springs measured at said block, and said roller simultaneously exerting tension on both of said springs when said gimbal frame is in a neutral position.

5. Restraining springs for a cased rate gyroscope comprising a mounting block movable with the gimbal frame of the gyroscope, two spaced cantilever springs fixed at one end thereof in opposing relationship to said block, means for adjusting the effective lengths of said springs, and a roller eccentrically mounted to the gyroscope case and engaging opposing faces of said springs, the diameter of said roller being greater than the distance between said springs measured at said block, and said roller simultaneously exerting tension on both of said springs when said gimbal frame is in a neutral position.

6. In an angular rate gyroscope having gimbal means and supporting means therefor, a pair of spaced opposing cantilever springs on one of said means, and a roller on said other means engaging said springs and simultaneously exerting tension on both of said springs when said gimbal means is in a neutral position relative to said supporting means.

7. In an angular rate gyroscope having gimbal means and supporting means therefor, a pair of spaced opposing cantilever springs on one of said means each having one end free, and a roller on said other means positioned between said springs adjacent said free ends and engaging opposing faces of said springs.

8. In an angular rate gyroscope having gimbal means and supporting means therefor, a pair of cantilever springs on one of said means, a roller on said other means engaging said springs, and means for independently adjusting the effective lengths of said springs.

9. In an angular rate gyroscope having gimbal means and supporting means therefor, a pair of spaced opposing cantilever springs on one of said means, and a single element on said other means engaging opposing faces of said springs and movable transversely thereof to adjust said gimbal means to neutral position relative to said supporting means.

ROBERT T. MAIORANY.

REFERENCES CITED

The following references are of record in the file of this patent:

UNITED STATES PATENTS

| Number | Name | Date |
| --- | --- | --- |
| 1,597,788 | Henderson | Aug. 31, 1926 |
| 2,199,290 | Moss | Apr. 30, 1940 |
| 2,290,232 | Fischer | July 21, 1942 |
| 2,351,629 | Noxon | June 20, 1944 |
| 2,444,625 | Bevins | July 6, 1948 |
| 2,469,406 | Payne et al. | May 10, 1949 |

FOREIGN PATENTS

| Number | Country | Date |
| --- | --- | --- |
| 162,304 | Great Britain | May 5, 1921 |
| 81,246 | Sweden | Aug. 21, 1934 |
| 225,845 | Switzerland | May 17, 1943 |